United States Patent Office 3,728,303
Patented Apr. 17, 1973

3,728,303
HEAT STABILIZED VINYLIDENE FLUORIDE POLYMER
Yutaka Kometani, Nishinomiya, Shun Koizumi, Osaka, and Takesi Suzuki and Chuzo Okuno, Settu, Japan, assignors to Daikin Kogyo Co., Ltd., Osaka-fu, Japan
No Drawing. Continuation-in-part of application Ser. No. 689,800, Dec. 12, 1967. This application Oct. 7, 1970, Ser. No. 78,967
Claims priority, application Japan, Dec. 12, 1966, 41/81,422
Int. Cl. C08f 45/56
U.S. Cl. 260—45.7 R          6 Claims

ABSTRACT OF THE DISCLOSURE

Polyvinylidene fluoride stabilized against heat, especially furnished with stability at a high temperature around 260° C., containing from 0.01 to 5% by weight of at least one of sodium chloride, sodium chlorate, potassium chloride and potassium chlorate.

---

This is a continuation-in-part of copending application Ser. No. 689,800, filed Dec. 12, 1967, now abandoned.

The present invention relates to heat stabilized polyvinylidene fluoride. More particularly, it relates to polyvinylidene fluoride having improved stability at a high temperature around 260° C. In addition, it relates to a method for heat stabilization of polyvinylidene fluoride.

Polyvinylidene fluoride possesses various favorable physical properties such as marked toughness and high elasticity. Further, it is particularly excellent in weatherproof property. It is useful as a thermoplastic material capable of being molded, pressed, flowed or extruded into film or other various shapes. Accordingly, the said polymer is increasingly demanded for various purposes, e.g. for making protective films, pipe, tubing, plastic pumps and many other articles.

Without any stabilizer additive, however, the temperature around the melting point of the polymer causes coloring to yellow to brown. After prolonged heating, the polymer is finally colored black with decomposition. Simultaneously, the physical characteristics which make the polymer highly useful are indispensably lost. Thus, the stabilization of polyvinylidene fluoride is particularly required for the utilization of its thermoplasticity.

Accordingly, a fundamental object of the present invention is to provide heat stabilized polyvinylidene fluoride. In another aspect, an object of the present invention is to provide a composition comprising polyvinylidene fluoride and at least one stabilizer additive. A further object of the invention is to provide a thermoplastic resin capable of being extruded with no substantial affection on its physical characteristics even at an elevated temperature. A still further object of the invention is to provide a method for the high temperature stabilization of polyvinylidene fluoride. These and other objects will be apparent to those conversant with the art to which the present invention pertains from the general and specific disclosures as hereinafter set forth.

According to the present invention, the heat stabilized resin can be prepared by addition of at least one stabilizer additive to polyvinylidene fluoride. As the stabilizer additive of the present invention, there is used at least one of sodium chloride, sodium chlorate, potassium chloride and potassium chlorate.

On the other hand, high molecular polyvinylidene fluoride to be stabilized may be derived from free radical polymerization of vinylidene fluoride monomer. As ever well known, the free radical polymerization of vinylidene fluoride monomer can be initiated by a catalytic peroxide.

It may be noted that the effect of the above mentioned stabilizers on those polymers derived from the polymerization catalyzed by persulfates such as ammonium persulfate and potassium persulfate is particularly distinguished, though it can be satisfactorily achieved with other polymerized materials, e.g. by various organic peroxides.

When the amount of the stabilizer additive is less than 0.01% by weight of the total material, the desired effect of stabilization can be not satisfactorily ascertained. On the contrary, when more than 5% by weight of the additive is contained, the physical characteristics of the polymer are undesirably affected. In the latter case, tensile strength, elasticity and stability to light are particularly obstructed. Accordingly, the amount of the stabilizer additive required to obtain a satisfactory result may vary from as little as 0.01% by weight of the combined weight of the polymer and the stabilizer additive to as much as 5% by weight.

Incorporation of the stabilizer additive into the polymerized material can be executed in various manners. For instance, powder damped with a suitable solvent such as acetone or aqueous suspension of polyvinylidene fluoride may be added to aqueous solution of the stabilizer additive and evaporated to dryness. Alternatively, the stabilizer finely ground may be added to aqueous suspension of the polymer. Furthermore, there can be successfully employed a method which comprises admixing the stabilizer additive with the polymer and grinding the mixture under a dry state or in the presence of such a suitable medium for the wet grinding as water or acetone. That is, the incorporation of the additive may be carried out according to a per se conventional manner.

Although the stabilization mechanism of the present invention has never been elucidated, the thus treated polymer is satisfactorily stable at extrusion or injection molding temperature, and the molded products are transparent and furnished with good physical properties. Moreover, it is notable that, the once molded products can be further molded under heating while showing good stability to heat.

The following examples will illustrate the presently-preferred embodiments of the present invention. It should be understood that those examples are given for the purpose of illustration only and not of limitation.

EXAMPLE 1

An autoclave made of stainless steel and designed to withstand a pressure in excess of 100 kg./cm.$^2$ is flushed with pure oxygen-free nitrogen, and 100 parts of deoxygenated distilled water, 0.4 part of ammonium persulfate and 0.2 part of sodium hydrogen sulfite are charged therein. The aqueous solution is frozen, and the autoclave is closed. The nitrogen in the autoclave is replaced by vinylidene fluoride monomer, and then 40 parts of vinylidene fluoride monomer are admitted. The polymerization is executed at 20° C. for 2 hours. Then, unreacted portion of the vinylidene fluoride monomer is removed. The polymer is collected by filtration, washed with water thoroughly and dried at 120° C. The intrinsic viscosity of thus obtained polyvinylidene fluoride is 0.85, when determined at 35° C. in dimethylacetamide.

To a mixture of 200 g. of the polyvinylidene fluoride and 500 ml. of acetone, there is added a solution of a certain amount (0.1 g., 0.2 g., 0.5 g. or 1.0 g.) of the stabilizer additive in 300 ml. of water, and the resultant mixture is well blended and dried at 80° C.

Using a flow-tester, the polyvinylidene fluoride admixed with the stabilizer additive is extruded from a nozzle of 1 mm. in diameter and 1 mm. in length at 260° C. by a pressure of 100 kg./cm.$^2$. The appearance (coloring) of the extruded article is observed by the naked eye. The results are shown in Table 1 wherein the degrees of coloring are appreciated according to the following criteria:

| Appearance: | Degree of coloring |
|---|---|
| Colorless | 0 |
| Faint brown | 1 |
| Light brown | 2 |
| Brown | 3 |
| Dark brown | 4 |
| Black | 5 |

TABLE 1
Degree of Coloring of Polymer after Heat Extrusion

| Additive | Content of additive | | | |
|---|---|---|---|---|
| | 0.05% | 0.1% | 0.25% | 0.5% |
| Sodium chloride | 0 | 0 | 0 | 0 |
| Potassium chloride | 0 | 0 | 0 | 0 |
| Sodium chlorate | 0 | 0 | 1 | 2 |
| Potassium chlorate | 0 | 0 | 1 | 2 |
| Sodium bromate | 0 | 0 | 1 | 2 |
| Potassium bromate | 0 | 0 | 1 | 2 |
| Blank (nothing added) | 4 | | | |

Hereupon, the polymer of which coloring degree is retained at less than 3 can be utilized for some purposes, because the essential physical characteristics of the polymer are preserved even where actual coloring to some extent takes place. But, if the degree comes up to 4 or more, the polymer can not be practically valuable because of lowering of the physical properties.

EXAMPLE 2

Polyvinylidene fluoride prepared in Example 1 is admixed with the stabilizer additive and dried in the same manner as Example 1.

The resultant composition (5 g.) is pressed in a mold of 60 mm. in diameter at 230° C. for 15 minutes with a pressure of 1 kg./cm.² and subsequently for 5 minutes with a pressure of 100 kg./cm.² to form a sheet of about 1 mm. in thickness. The sheet is heated at 200° C. for 1 hour or 16 hours (heat treatment) and coloring is observed. The results are shown in Table 2 wherein the degrees of coloring are apreciated as illustrated above:

TABLE 2
Degree of Coloring of Polymer before and after Heat Treatment

| Additive | Content of additive | | | | | |
|---|---|---|---|---|---|---|
| | Before heat treatment | | After heat treatment | | | |
| | | | 1 hour | | 16 hours | |
| | 0.05% | 0.1% | 0.05% | 0.1% | 0.05% | 0.1% |
| Sodium chloride | 0 | 0 | 0 | 0 | 1 | 1 |
| Potassium chloride | 0 | 0 | 0 | 0 | 1 | 1 |
| Sodium chlorate | 0 | 0 | 0 | 0 | 1 | 1 |
| Potassium chlorate | 0 | 0 | 0 | 0 | 1 | 1 |
| Sodium bromate | 0 | 0 | 1 | 1 | 3 | 3 |
| Potassium bromate | 0 | 0 | 1 | 1 | 3 | 3 |
| Blank (nothing added) | 3 | | 3 | | 4 | |

EXAMPLE 3

In an autoclave as in Example 1, there are charged 100 parts of deoxygenated distilled water and 0.4 part of di-t-butyl peroxide. The content is frozen, and the autoclave is closed. The internal space of the autoclave is replaced by vinylidene fluoride monomer, and 40 parts of vinylidene fluoride monomer are admitted. The polymerization is executed at 120° C. for 4 hours. Then, unreacted portion of the vinylidene fluoride monomer is removed. The polymer is collected by filtration, washed thoroughly with water and dried at 120° C. The intrinsic viscosity of thus obtained polyvinylidene fluoride is 1.7.

The polyvinylidene fluoride is admixed with the stabilizer additive and subjected to observation of stability to heat in a similar manner to Example 1. The results are shown in Table 3 wherein the degrees of coloring are appreciated as illustrated above:

TABLE 3
Degree of Coloring of Polymer after Heat Extrusion

| Additive | Content of additive | | | |
|---|---|---|---|---|
| | 0.05% | 0.1% | 0.25% | 0.5% |
| Sodium chloride | 0 | 0 | 0 | 0 |
| Potassium chloride | 0 | 0 | 0 | 0 |
| Potassium chlorate | 0 | 0 | 0 | 0 |
| Blank (nothing added) | 1 | | | |

EXAMPLE 4

Polymerization is carried out in a manner similar to Example 3 but using 0.4 part of t-butyl per-i-butyrate instead of di-t-butyl peroxide. The reaction is executed at 90° C. for 4 hours. The intrinsic viscosity of the polymer afforded is 1.5. The test results as to the heat stability are shown in Table 4 wherein the degrees of coloring are appreciated as illustrated above:

TABLE 4
Degree of Coloring of Polymer after Heat Extrusion

| Additive | Content of additive | | | |
|---|---|---|---|---|
| | 0.05% | 0.1% | 0.25% | 0.5% |
| Sodium chloride | 1 | 1 | 1 | 1 |
| Potassium chloride | 1 | 1 | 1 | 1 |
| Sodium chlorate | 0 | 0 | 0 | 1 |
| Blank (nothing added) | 2 | | | |

In the above examples, parts are by weight.

What is claimed is:

1. Polyvinylidene fluoride composition containing 0.01 to 5% by weight of at least one of sodium chloride, sodium chlorate, potassium chloride and potassium chlorate.

2. The composition according to claim 1, wherein polyvinylidene fluoride is produced by polymerization of vinylidene fluoride, the polymerization being initiated by a member selected from the group consisting of ammonium persulfate, potassium persulfate, di-t-butyl peroxide and t-butyl per-i-butyrate.

3. A composition consisting essentially of polyvinylidene fluoride and sodium chloride incorporated therein in an amount of 0.01 to 5% by weight of the composition, the polyvinylidene fluoride being produced by polymerization of vinylidene fluoride under initiation by a member selected from the group consisting of ammonium persulfate, potassium persulfate, di-t-butyl peroxide and t-butyl per-i-butyrate.

4. A composition consisting essentially of polyvinylidene fluoride and sodium chlorate incorporated therein in an amount of 0.01 to 5% by weight of the composition, the polyvinylidene fluoride being produced by polymerization of vinylidene fluoride under initiation by a member selected from the group consisting of ammonium persulfate, potassium persulfate, di-t-butyl peroxide and t-butyl per-i-butyrate.

5. A composition consisting essentially of polyvinylidene fluoride and potassium chloride incorporated therein in an amount of 0.01 to 5% by weight of the composition, the polyvinylidene fluoride being produced by polymerization of vinylidene fluoride under initiation by a member selected from the group consisting of ammonium persulfate, potassium persulfate, di-t-butyl peroxide and t-butyl per-i-butyrate.

6. A composition consisting essentially of polyvinylidene fluoride and potassium chlorate incorporated therein in an amount of 0.01 to 5% by weight of the composition, the polyvinylidene fluoride being produced by polymerization of vinylidene fluoride under initiation by a member selected from the group consisting of ammonium persulfate, potassium persulfate, di-t-butyl peroxide and t-butyl per-i-butyrate.

References Cited

UNITED STATES PATENTS

| | | | |
|---|---|---|---|
| 2,643,988 | 6/1953 | Walter | 260—45.7 |
| 3,190,864 | 6/1965 | Shipp et al. | 260—92.1 |
| 3,438,934 | 4/1969 | Reinhardt | 260—45.75 |
| 3,328,343 | 6/1967 | Dollman | 260—45.75 |
| 2,435,537 | 2/1948 | Ford et al. | 260—92.1 |
| 2,456,262 | 12/1948 | Fields | 260—92.1 |
| 2,938,881 | 5/1960 | Gallagher | 260—45.7 |
| 2,955,099 | 10/1960 | Mallouk et al. | 260—45.7 |
| 3,154,519 | 10/1964 | Iserson | 260—45.75 |
| 3,223,664 | 12/1965 | Conlon | 260—29.1 |
| 3,419,522 | 12/1968 | Plimmer | 260—45.75 |

DONALD E. CZAJA, Primary Examiner

R. A. WHITE, Assistant Examiner

U.S. Cl. X.R.

260—92.1